United States Patent
Kokubun

(10) Patent No.: US 12,062,209 B2
(45) Date of Patent: Aug. 13, 2024

(54) FACE REGION DETECTION DEVICE, IMAGING APPARATUS, FACE REGION DETECTION METHOD, AND FACE REGION DETECTION PROGRAM

(71) Applicant: FUJIFILM Corporation, Tokyo (JP)

(72) Inventor: Hideaki Kokubun, Saitama (JP)

(73) Assignee: FUJIFILM Corporation, Tokyo (JP)

(*) Notice: Subject to any disclaimer, the term of this patent is extended or adjusted under 35 U.S.C. 154(b) by 389 days.

(21) Appl. No.: 17/369,388

(22) Filed: Jul. 7, 2021

(65) Prior Publication Data

US 2021/0337113 A1     Oct. 28, 2021

Related U.S. Application Data

(63) Continuation of application No. PCT/JP2019/044436, filed on Nov. 12, 2019.

(30) Foreign Application Priority Data

Jan. 30, 2019    (JP) ................... 2019-014202

(51) Int. Cl.
    *G06F 18/22*     (2023.01)
    *G06T 7/20*     (2017.01)
    (Continued)

(52) U.S. Cl.
    CPC ............ *G06T 7/74* (2017.01); *G06F 18/22* (2023.01); *G06T 7/20* (2013.01); *G06T 7/50* (2017.01);
    (Continued)

(58) Field of Classification Search
    CPC . G06F 18/22; G06T 2207/30201; G06T 7/20; G06T 7/50; G06T 7/70; G06T 7/74;
    (Continued)

(56) References Cited

U.S. PATENT DOCUMENTS 10,991,397 B2 *   4/2021   Michaud ............. G11B 27/102
2010/0172577 A1    7/2010   Matsushita et al.
(Continued)

FOREIGN PATENT DOCUMENTS

JP     2004-157778 A    6/2004
JP     2007-274197 A    10/2007
(Continued)

OTHER PUBLICATIONS

International Preliminary Report on Patentability (Form PCT/IPEA/409) for International Application No. PCT/JP2019/044436, dated Sep. 11, 2020, with English translation.
(Continued)

*Primary Examiner* — Daquan Zhao

(74) *Attorney, Agent, or Firm* — Birch, Stewart, Kolasch & Birch, LLP

(57) ABSTRACT

A system controller of a digital camera has a function of detecting a face region from a captured image which is output from an imaging element, and sets a face region detected from a first captured image, as a reference image, searches for a similar region similar to a specific image which is a part of the reference image from a second captured image output after the first captured image, and detects a first region including the similar region in the second captured image and having the same size as the reference image, as the face region. The position of the specific image in the reference image and the position of the similar region in the first region coincide with each other.

16 Claims, 12 Drawing Sheets

(51) Int. Cl.
*G06T 7/50* (2017.01)
*G06T 7/70* (2017.01)
*G06T 7/73* (2017.01)
*G06V 40/16* (2022.01)
*H04N 23/611* (2023.01)
*H04N 23/67* (2023.01)

(52) U.S. Cl.
CPC .............. *G06T 7/70* (2017.01); *G06V 40/161* (2022.01); *G06V 40/167* (2022.01); *H04N 23/611* (2023.01); *H04N 23/67* (2023.01); *G06T 2207/30201* (2013.01)

(58) Field of Classification Search
CPC .. G06V 40/161; G06V 40/167; H04N 23/611; H04N 23/635; H04N 23/67; H04N 23/675
USPC .................................. 348/129, 130, 169, 25
See application file for complete search history.

(56) References Cited

U.S. PATENT DOCUMENTS

| 2014/0161313 | A1 | 6/2014 | Ohishi |
| 2017/0310877 | A1 | 10/2017 | Takayama et al. |
| 2018/0007254 | A1 | 1/2018 | Tsuji |
| 2018/0101723 | A1* | 4/2018 | Wakako .................. G06V 20/40 |
| 2019/0034700 | A1* | 1/2019 | Xie .......................... G06T 7/246 |

FOREIGN PATENT DOCUMENTS

| JP | 2010-130493 A | 6/2010 |
| JP | 2011-29822 A | 2/2011 |
| JP | 2013-109590 A | 6/2013 |
| JP | 2014-116716 A | 6/2014 |
| JP | 2017-194656 A | 10/2017 |
| JP | 2018-4916 A | 1/2018 |
| JP | 2018-4918 A | 1/2018 |

OTHER PUBLICATIONS

International Search Report (Form PCT/ISA/210) for International Application No. PCT/JP2019/044436, dated Dec. 17, 2019, with English translation.
Written Opinion of the International Searching Authority (Form PCT/ISA/237) for International Application No. PCT/JP2019/044436, dated Dec. 17, 2019, with English translation.

* cited by examiner

FACE REGION DETECTION DEVICE, IMAGING APPARATUS, FACE REGION DETECTION METHOD, AND FACE REGION DETECTION PROGRAM

CROSS-REFERENCE TO RELATED APPLICATIONS

This application is a Continuation of PCT International Application No. PCT/JP2019/044436 filed on Nov. 12, 2019, which claims priority under 35 U.S.C § 119(a) to Japanese Patent Application No. 2019-014202 filed on Jan. 30, 2019. Each of the above application(s) is hereby expressly incorporated by reference, in its entirety, into the present application.

BACKGROUND OF THE INVENTION

1. Field of the Invention

The present invention relates to a face region detection device, an imaging apparatus, a face region detection method, and a face region detection program.

2. Description of the Related Art

An imaging apparatus provided with a function of detecting a face that is a part of a subject from a captured image has been known. In a case where a face is detected by the function, a face frame surrounding the detected face is superimposed and displayed on the captured image, and a target image in the face frame is brought into focus or exposure control is performed on the target image, so that an image can be captured under suitable conditions for the face. Alternatively, a tracking function that in a case where face detection from the captured image fails, stores a face detected immediately before the failure, as a template image, searches for a region similar to the template image from the captured image, and detects the region searched for, as a face region, has also been known (see JP2010-130493A, JP2011-029822A, and JP2018-004916A).

SUMMARY OF THE INVENTION

In the above-described tracking function, as the size of the reference template image becomes large, it takes time to search for a region similar to the template image, and the tracking performance decreases. JP2010-130493A, JP2011-029822A, and JP2018-004916A have not considered reducing the load of the tracking processing.

The present invention has been made in view of the above circumstances, and an object thereof is to provide a face region detection device, an imaging apparatus, a face region detection method, and a face region detection program, which are capable of performing face region detection processing with a light load.

A face region detection device according to an aspect of the present invention that detects a face region from a captured image which is output from an imaging element, the device comprises a processor configured to set the face region detected from a first captured image, as a reference image, and search for a similar region similar to a specific image which is a part of the reference image from a second captured image output after the first captured image, in a case where the second captured image is determined to have the similar region similar to the specific image, set a first region as a face region, the first region includes the similar region in the second captured image, and set the first region such that a size of the first region is same for a size of the reference image, and such that a position of the similar region in the first region coincide with a position of the specific image in the reference image, using a positional relationship between the reference image and the specific image in the first captured image.

An imaging apparatus according to another aspect of the present invention comprises the face region detection device and the imaging element.

A face region detection method according to still another aspect of the present invention of detecting a face region from a captured image which is output from an imaging element, the method comprises a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image, in which, in the tracking processing step, setting the first region such that a size of the first region is same for a size of the reference image, and such that a position of the similar region in the first region coincide with a position of the specific image in the reference image, using a positional relationship between the reference image and the specific image in the first captured image.

A non-transitory computer readable recording medium storing a face region detection program according to still another aspect of the present invention for detecting a face region from a captured image which is output from an imaging element, the program causing a computer to execute a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image, in which, in the tracking processing step, setting the first region such that a size of the first region is same for a size of the reference image, and such that a position of the similar region in the first region coincide with a position of the specific image in the reference image, using a positional relationship between the reference image and the specific image in the first captured image.

According to the present invention, it is possible to provide a face region detection device, an imaging apparatus, a face region detection method, and a face region detection program, which are capable of performing face region detection processing with a light load.

DESCRIPTION OF THE PREFERRED EMBODIMENTS

Hereinafter, embodiments of the present invention will be described with reference to the drawings.

Figure 1:
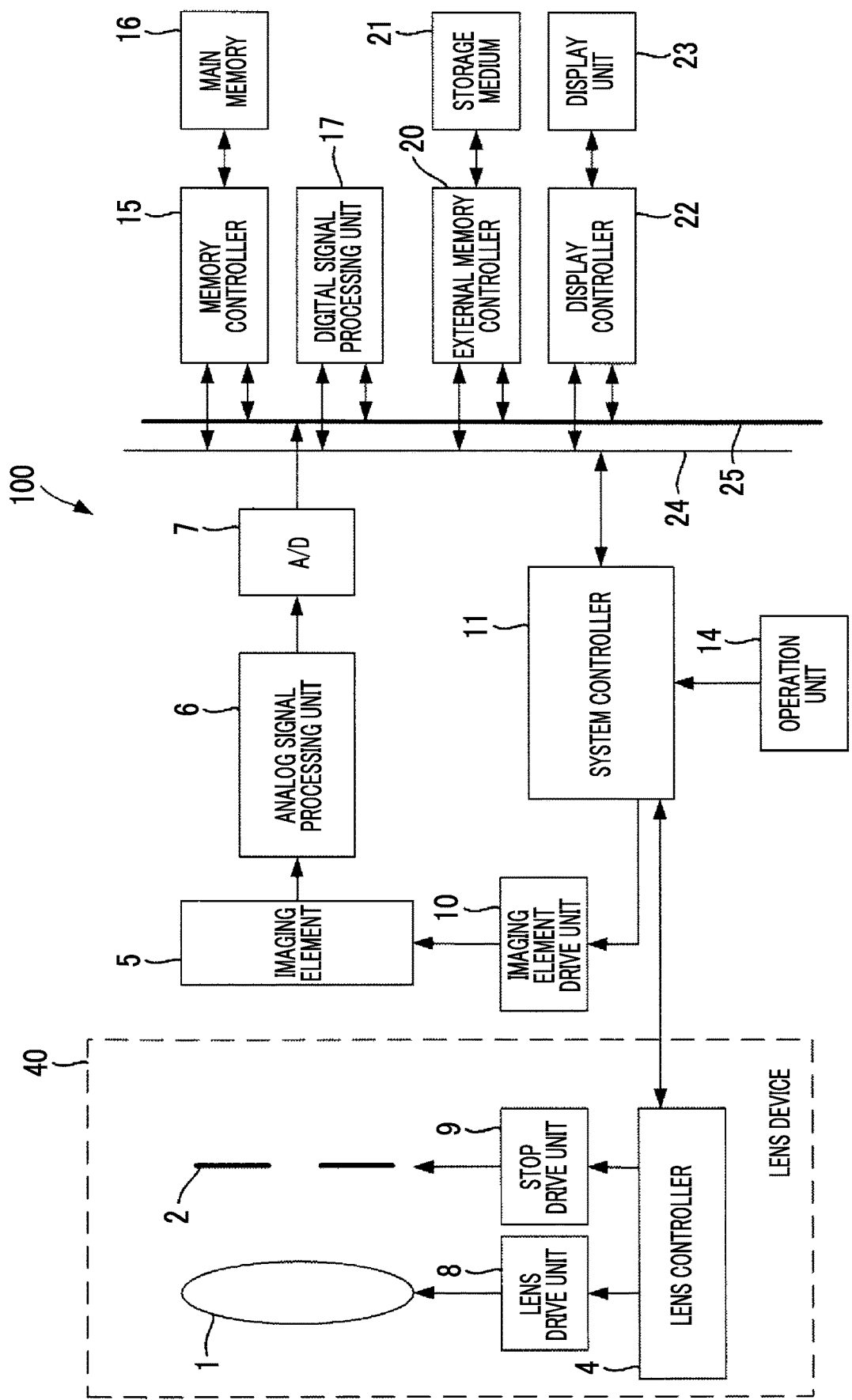
FIG. 1 is a diagram showing a schematic configuration of a digital camera 100 which is one embodiment of an imaging apparatus according to the embodiment of the present invention.

FIG. 1 is a diagram showing a schematic configuration of a digital camera 100 which is one embodiment of an imaging apparatus according to the embodiment of the present invention.

The digital camera shown in FIG. 1 comprises a lens device 40 having an imaging lens 1, a stop 2, a lens controller 4, a lens drive unit 8, and a stop drive unit 9.

The lens device 40 may be attachable to and detachable from the digital camera 100, or may be integrated with the digital camera 100.

The imaging lens 1 and the stop 2 constitute an imaging optical system, and the imaging optical system includes at least a focus lens movable in an optical axis direction.

The focus lens is a lens for adjusting the focus of the imaging optical system, and is composed of a single lens or a plurality of lenses. By moving the focus lens in the optical axis direction, the position of the principal point of the focus lens is changed along the optical axis direction, and the focal position on the subject side is changed. As the focus lens, a liquid lens capable of changing the position of the principal point in the optical axis direction by electrical control may be used.

The lens controller 4 of the lens device 40 is configured to be able to communicate with the system controller 11 of the digital camera 100 in a wired or wireless manner.

In accordance with an instruction from the system controller 11, the lens controller 4 drives the focus lens included in the imaging lens 1 via the lens drive unit 8 to change the position of the principal point of the focus lens, or controls the opening degree of the stop 2 via the stop drive unit 9.

The digital camera 100 further comprises an imaging element 5 such as a charge coupled device (CCD) image sensor or a complementary metal oxide semiconductor (CMOS) image sensor that images a subject through the imaging optical system, an analog signal processing unit 6 that performs analog signal processing such as correlated double sampling processing, which is connected to the output of the imaging element 5, and an analog-to-digital conversion circuit 7 that converts an analog signal output from the analog signal processing unit 6 into a digital signal.

The analog signal processing unit 6 and the analog-to-digital conversion circuit 7 are controlled by the system controller 11. The analog signal processing unit 6 and the analog-to-digital conversion circuit 7 may be integrated with the imaging element 5.

The imaging element 5 has an imaging surface in which a plurality of pixels are arranged two-dimensionally, and converts a subject image which is formed in the imaging surface through the imaging optical system, into electrical signals (pixel signals) by the plurality of pixels, to output the electrical signals. Hereinafter, the set of pixel signals output from each pixel of the imaging element 5 is referred to as a captured image.

The system controller 11 that controls the entire electrical control system of the digital camera 100 in an integrated manner drives the imaging element 5 via the imaging element drive unit 10 and makes the imaging element 5 output a subject image captured through the imaging optical system of the lens device 40 as a captured image.

A command signal from a user is input to the system controller 11 through an operation unit 14.

The system controller 11 controls the entire digital camera 100 in an integrated manner, and as the hardware structure thereof, various processors that execute programs to perform processing are used.

Examples of the various processors include a central processing unit (CPU) which is a general-purpose processor executing program to perform various processing, a programmable logic device (PLD) such as a field programmable gate array (FPGA), which is a processor having a changeable circuit configuration after manufacturing, and a dedicated electric circuit such as an application specific integrated circuit (ASIC), which is a processor having a circuit configuration specifically designed to execute specific processing.

More specifically, as the structures of the various processors, electrical circuitry in which circuit elements such as semiconductor elements are combined is used.

The system controller 11 may be constituted of one of the various processors, or may be constituted of a combination of two or more processors having the same type or different types (for example, a combination of a plurality of FPGAs or a combination of a CPU and an FPGA).

Further, the electrical control system of the digital camera 100 comprises a main memory 16 that is constituted of a random access memory (RAM), a memory controller 15 that controls storage of data into the main memory 16 and read-out of data from the main memory 16, a digital signal processing unit 17 that performs digital signal processing on the captured image output from the analog-to-digital conversion circuit 7 and generates captured image data according to various formats such as a Joint Photographic Experts Group (JPEG) format, an external memory controller 20 that controls storage of data into a storage medium 21 and read-out of data from the storage medium 21, a display unit 23 that is constituted of an organic electroluminescence (EL) display, a liquid crystal display, or the like, and a display controller 22 that controls display of the display unit 23.

The storage medium 21 is a semiconductor memory such as a flash memory built in the digital camera 100, a portable semiconductor memory attachable to and detachable from the digital camera 100, or the like.

The memory controller 15, the digital signal processing unit 17, the external memory controller 20, and the display controller 22 are connected to one another via a control bus 24 and a data bus 25, and are controlled by the instruction from the system controller 11.

Figure 2:
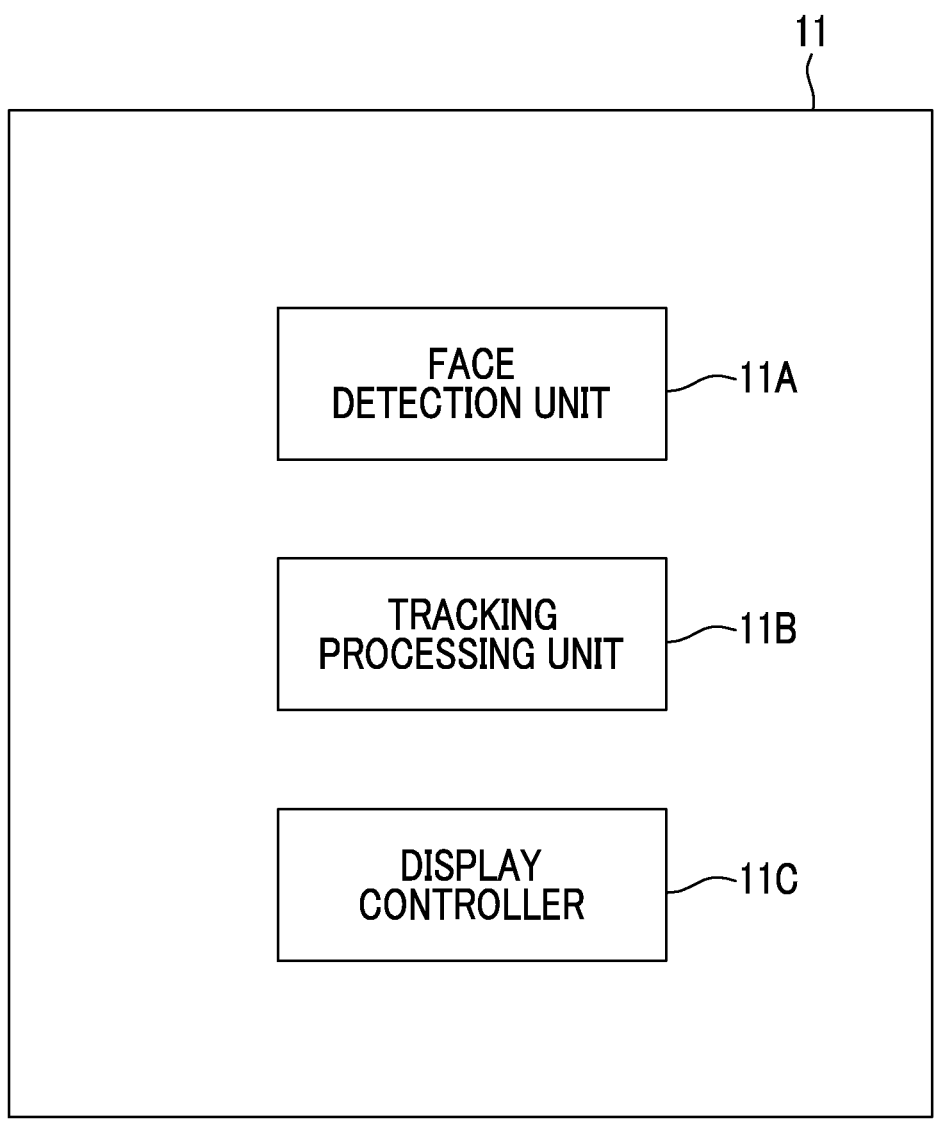
FIG. 2 is a functional block diagram of a system controller 11 of the digital camera 100 shown in FIG. 1.

FIG. 2 is a functional block diagram of the system controller 11 of the digital camera 100 shown in FIG. 1.

The system controller 11 executes programs including a face region detection program, to function as a face detection unit 11A, a tracking processing unit 11B, and a display controller 11C. The system controller 11 in the present specification constitutes the face region detection device.

The face detection unit 11A performs face detection processing of detecting a face region showing the face of a person or an animal from the captured image output from the imaging element 5 when capturing a motion picture for displaying a live view image or the like.

In a case where detection of the face region fails (a state in which the face region cannot be detected) through the face detection processing on the captured image which is a detection target of a face region, the tracking processing unit 11B performs following tracking processing.

Tracking processing is processing of setting a face region detected from a first captured image which is output from the imaging element 5 prior to a captured image (referred to as a second captured image) which is a detection target, as a reference image, searching for a similar region similar to a specific image which is a part of the reference image from the second captured image, and detecting a first region including the similar region in the second captured image and having the same size as the reference image, as the face region. The above-described face region detected from the first captured image is obtained by either the face detection processing or the tracking processing.

In a case where the face region is detected from the captured image which is a detection target by either the face detection unit 11A or the tracking processing unit 11B, the display controller 11C makes the display unit 23 display an image in which a frame showing the face region is superimposed on the captured image.

Figure 3:
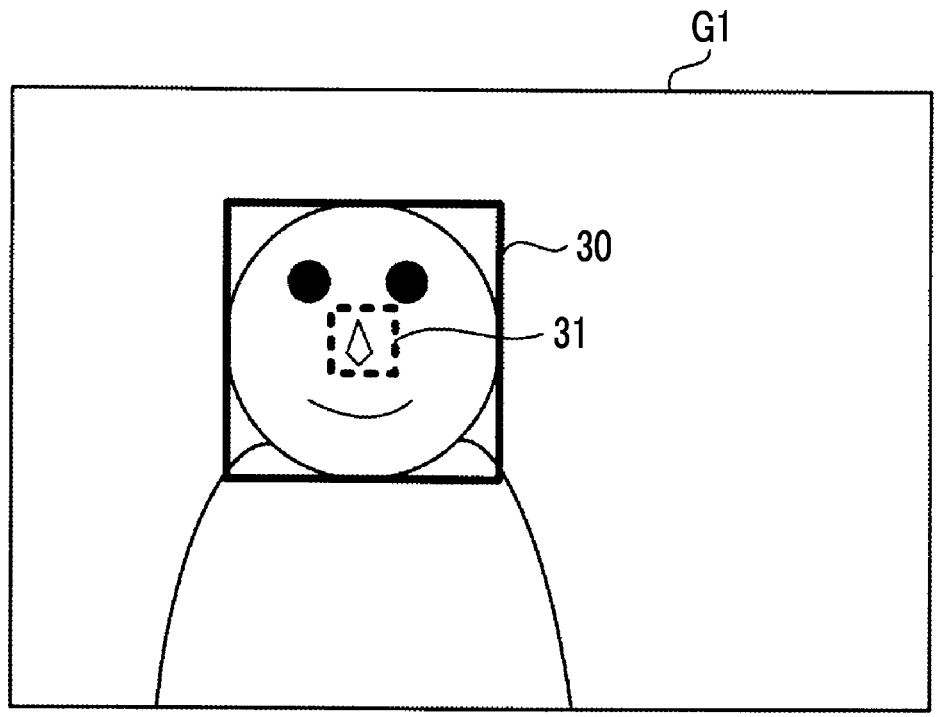
FIG. 3 is a schematic diagram illustrating a specific example of tracking processing by the system controller 11.
Figure 3:
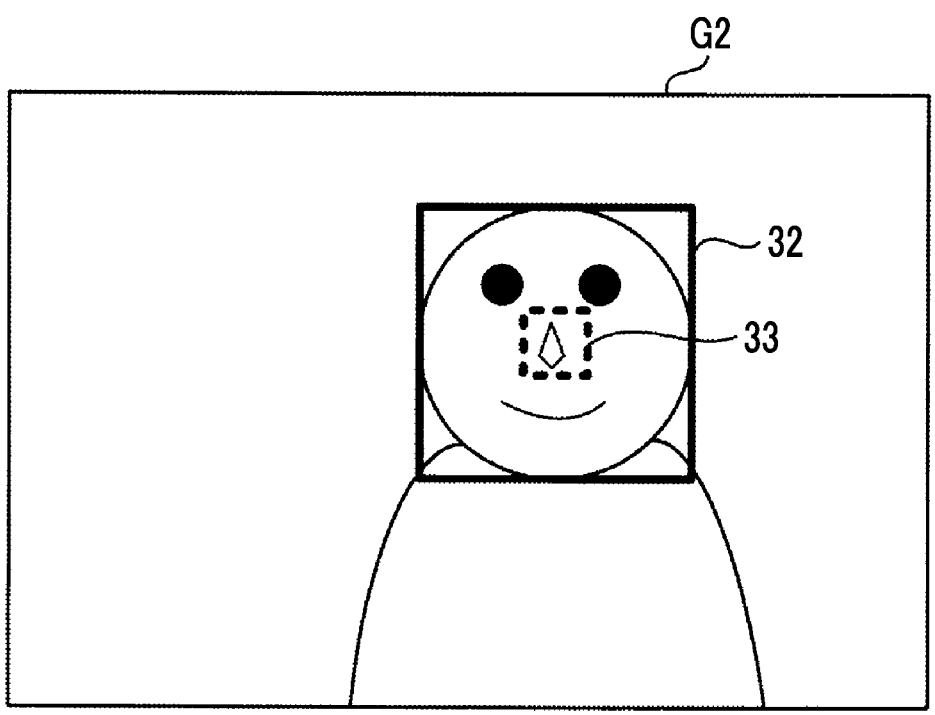

FIG. 3 is a schematic diagram illustrating a specific example of the tracking processing by the system controller 11. FIG. 3 shows a first captured image G1 and a second captured image G2 obtained by imaging a person moving from left to right in the figure with the imaging element 5. The second captured image G2 is an image output from the imaging element 5 after the first captured image G1.

In the example of FIG. 3, it is assumed that a face region 30 is detected from the first captured image G1 through the face detection processing. In a case where the face region cannot be detected from the second captured image G2 through the face detection processing, the tracking processing unit 11B sets the face region 30 detected from the first captured image G1 as a reference image. Then, the tracking processing unit 11B decides a part of the reference image (in the example of FIG. 3, a region narrower than the reference image which is set at the center of the reference image) as a specific image 31. The tracking processing unit 11B searches for a similar region 33 similar to the specific image 31 from the second captured image G2, and detects a first region 32 including the similar region 33 and having the same size as the reference image, as a face region.

The tracking processing unit 11B decides the position of the first region 32 such that the position of the specific image 31 in the reference image (face region 30) and the position of the similar region 33 in the first region 32 coincide with each other (in other words, a positional relationship between the first region 32 and the similar region 33 coincide with a positional relationship between the reference image and the specific image 31). With this, it is possible to detect the first region 32 that coincides with the face region 30 as the face region, while reducing processing load required for searching for the similar region 33.

Figure 4:
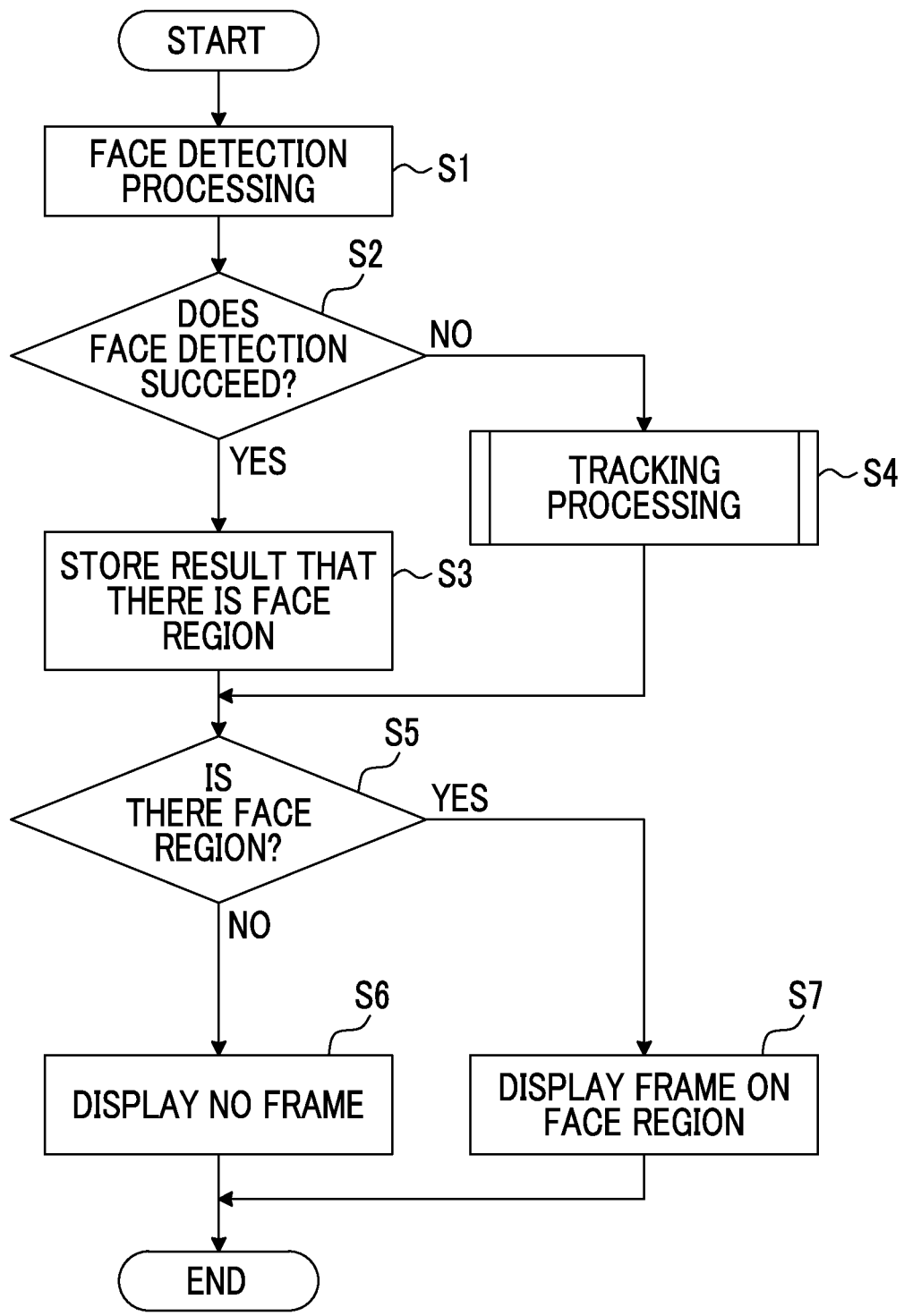
FIG. 4 is a flowchart illustrating an operation of the system controller 11.
Figure 5:
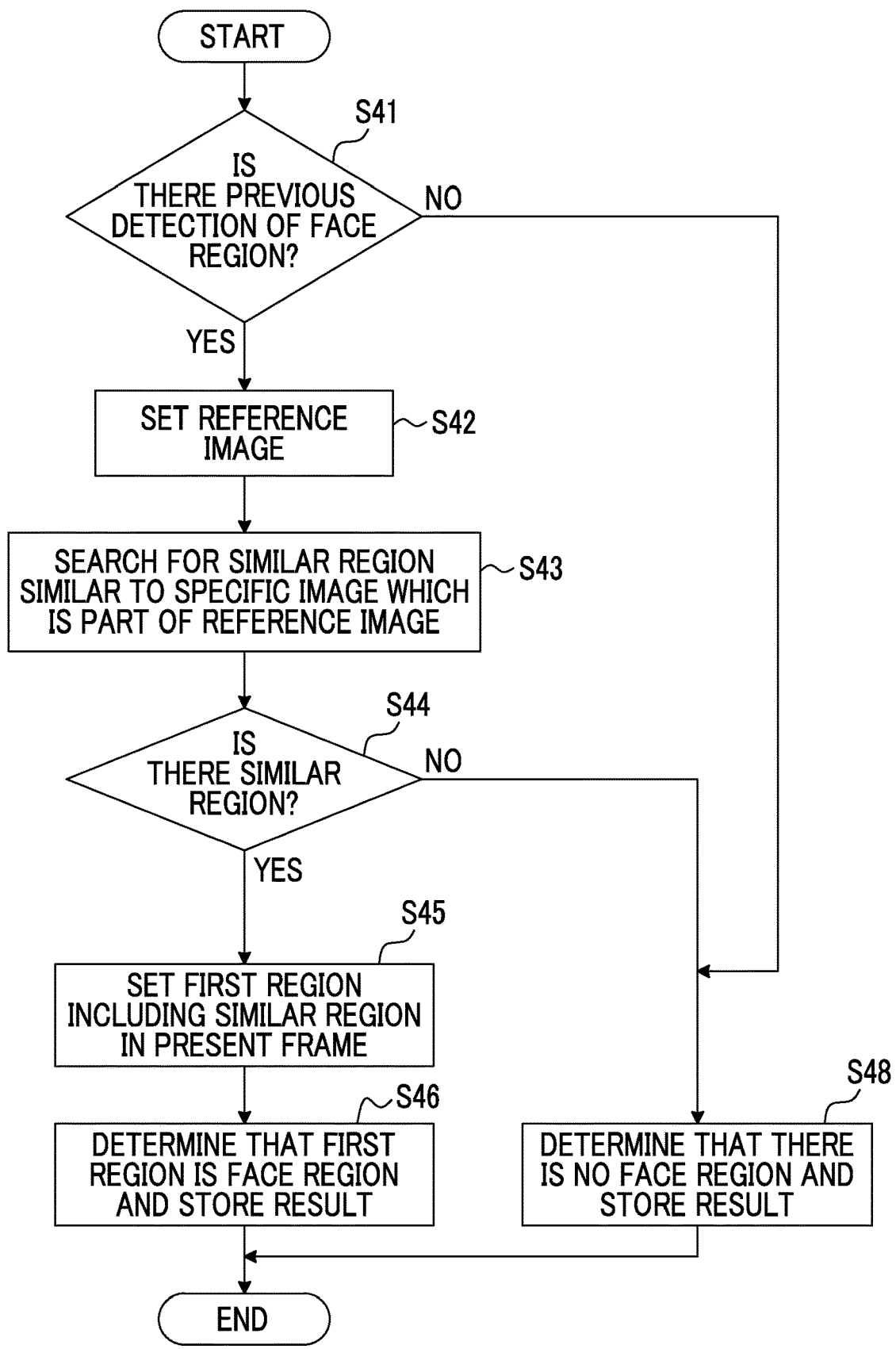
FIG. 5 is a flowchart showing details of Step S4 shown in FIG. 4.

FIG. 4 is a flowchart illustrating an operation of the system controller 11. FIG. 5 is a flowchart showing details of Step S4 shown in FIG. 4.

After the motion picture capturing is started, when the second captured image which is a detection target of a face region is output from the imaging element 5, the face detection unit 11A performs face detection processing of detecting the face region from the second captured image (Step S1). In a case where the face region is detected from the second captured image as a result of the face detection processing (Step S2: YES), the result that there is the face region is stored in the memory (Step S3). On the other hand, in a case where the face region is not detected from the second captured image as a result of the face detection processing (Step S2: NO), tracking processing is performed in Step S4.

As shown in FIG. 5, in the tracking processing, first, the tracking processing unit 11B determines whether or not the face region is detected through the face detection processing or the tracking processing with respect to the first captured image which is output prior to the second captured image (Step S41).

In a case where determination in Step S41 is NO, the tracking processing cannot be performed. Therefore, the tracking processing unit 11B determines that there is no face region in the second captured image, and stores the result in the memory (Step S48). On the other hand, in a case where determination in Step S41 is YES, the tracking processing unit 11B sets the image of the face region detected from the first captured image, as the reference image (Step S42).

Next, the tracking processing unit 11B decides a part of the set reference image as a specific image, and searches for a similar region similar to the specific image from the second captured image (Step S43).

In a case where there is the similar region as a result of the search in Step S43 (Step S44: YES), the tracking processing unit 11B sets the above-described first region including the similar region in the second captured image (Step S45), determines that the set first region is the face region, and stores the result that there is the face region in the memory (Step S46).

In a case where there is no similar region as a result of the search in Step S43 (Step S44: NO), the tracking processing unit 11B determines that there is no face region in the second captured image, and stores the result in the memory (Step S48). Note that, in a case where a state in which determination in Step S2 is NO and determination in Step S44 is NO occurs once, the tracking processing unit 11B may not perform processing of Step S48, and in a case where the state continues for a certain number of times, the tracking processing unit 11B may perform processing of Step S48.

After Step S3 and Step S4 of FIG. 4, the display controller 11C refers to the latest information on the detection result of the face region stored in the memory. In a case where there is the face region (Step S5: YES), the display controller 11C makes the display unit 23 display an image in which a frame showing the face region is superimposed on the second captured image (Step S7). In a case where there is no face region (Step S5: NO), the display controller 11C makes the display unit 23 display the second captured image without the frame showing the face region superimposed (Step S6). The above-described processing is repeatedly performed during motion picture capturing.

As described above, with the digital camera 100, in searching for (tracking) the first region 32 similar to the face region 30 detected in the past, from the second captured image G2, as exemplified in FIG. 3, the similar region 33 is searched for by using the specific image 31 as a region narrower than the face region 30 detected in the past, and the first region 32 is decided from the position of the similar region 33. Therefore, it is possible to reduce the processing load of the system controller 11 required for tracking the first region 32 similar to the face region 30 from the second captured image G2. As a result, the speed of the face detection processing can be increased or the cost for the system controller 11 can be decreased.

In the example of FIG. 3, the tracking processing unit 11B sets the specific image 31 in the reference image (face region 30) at the center of the reference image, but the present invention is not limited thereto. For example, the tracking processing unit 11B may analyze the reference image and decide which portion of the reference image is to be the specific image on the basis of the analysis result. Specifically, the tracking processing unit 11B obtains the contrast value of the reference image, and decides a portion of the reference image in which the contrast value exceeds a predetermined threshold value, as the specific image.

Figure 6:
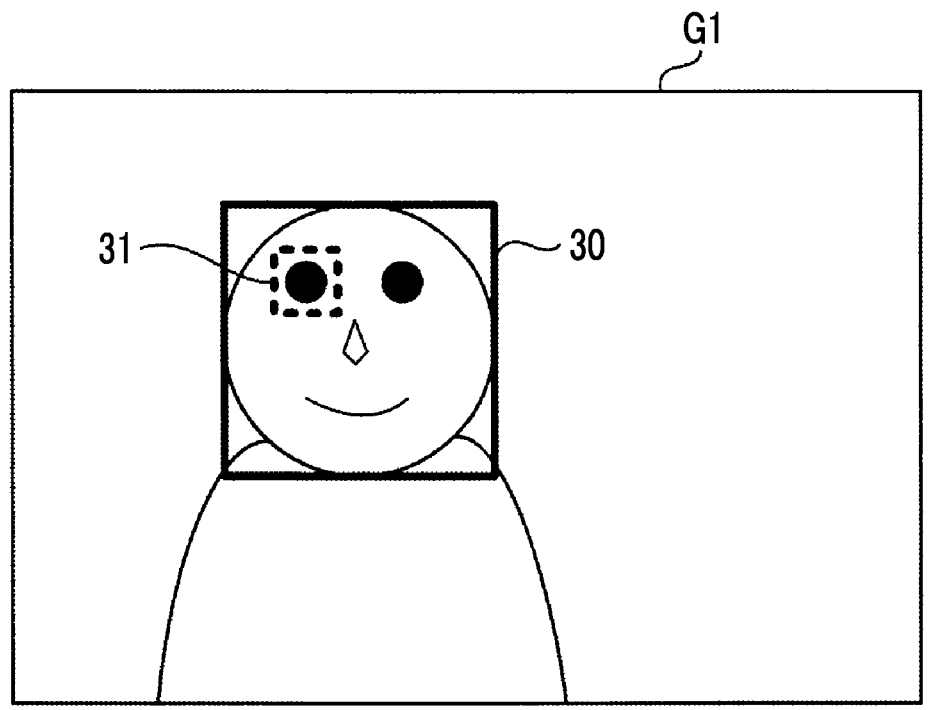
FIG. 6 is a schematic diagram illustrating a modification example of the specific example of the tracking processing of the system controller 11.
Figure 6:
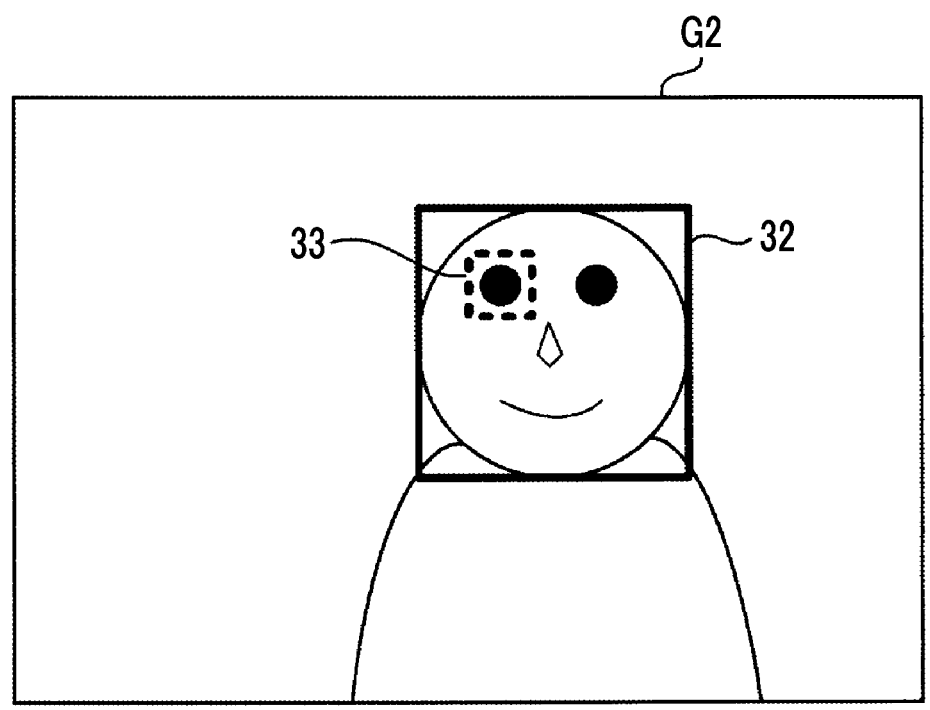

FIG. 6 is a schematic diagram illustrating a modification example of the setting example of the specific image in the reference image. In the example of FIG. 6, the eye region of a person in which the contrast value is a threshold value or more, among the face region 30 set as the reference image, is decided as the specific image 31. Then, the similar region 33 similar to the specific image 31 is searched for from the second captured image G2, and the first region 32 including the similar region 33 is detected as the face region.

As such, by setting a portion having high contrast as the specific image 31, the search accuracy of the similar region 33 can be improved, and the detection accuracy of the first region 32, which is the face region, can be improved.

Note that, here, the portion of the reference image in which the contrast value is the threshold value or more is set as the specific image, but the eye may be detected from the reference image and a portion including the detected eye may be decided as the specific image.

Figure 7:
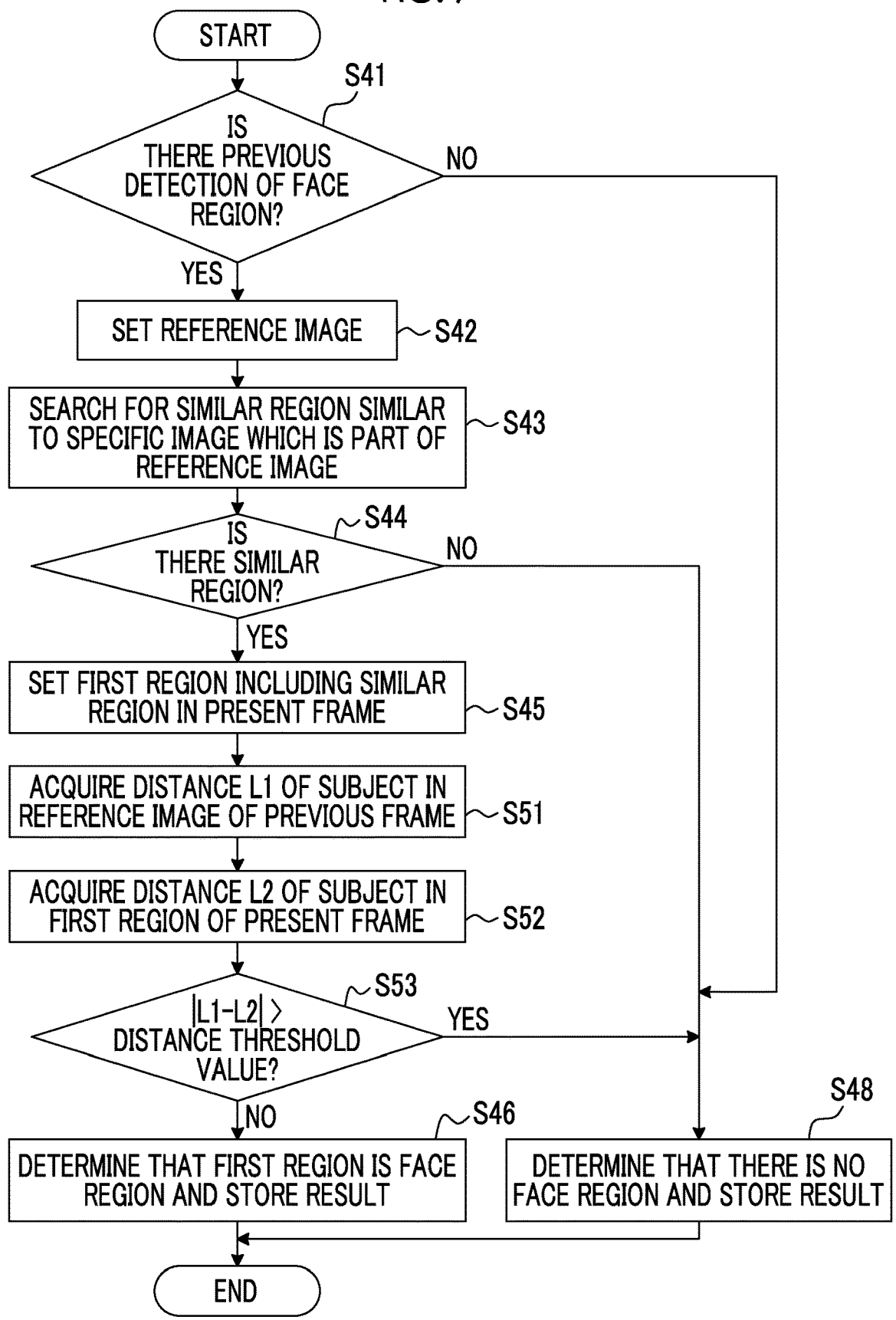
FIG. 7 is a flowchart showing a modification example of the tracking processing in Step S4 shown in FIG. 4.

FIG. 7 is a flowchart showing a modification example of the tracking processing in Step S4 shown in FIG. 4. The flowchart shown in FIG. 7 is the same as that of FIG. 4 except that Step S51, Step S52, and Step S53 are added between Step S45 and Step S46. In FIG. 7, the same processing as in FIG. 4 is designated by the same reference numerals and the description thereof will not be repeated. Further, in the operation of the modification example, it is assumed that the imaging element 5 includes the above-described plurality of pixels including phase difference detection pixels.

After Step S45, the tracking processing unit 11B calculates first distance information L1 of the subject included in the reference image set from the first captured image in which the face region has been detected, on the basis of signals of phase difference detection pixels included in the reference image (Step S51). Further, the tracking processing unit 11B calculates second distance information L2 of the subject included in the first region set in the second captured image which is a detection target, on the basis of signals of phase difference detection pixels included in the first region (Step S52).

Next, the tracking processing unit 11B determines whether or not the absolute value of the difference between the first distance information L1 and the second distance information L2 exceeds a predetermined distance threshold value (Step S53). In a case where the absolute value of the difference between the first distance information L1 and the second distance information L2 becomes large, which means that the subject included in the face region of the first captured image and the subject included in the face region (first region) detected from the second captured image are likely to be significantly different from each other. That is, in a case where the absolute value of the difference is large, determination can be made that an object other than the face is included in the first region and erroneous tracking is likely to occur.

Therefore, in a case where the absolute value of the difference between the first distance information L1 and the second distance information L2 exceeds the distance threshold value (Step S53: YES), the tracking processing unit 11B determines that the first region set in Step S45 is a non-face region, and the process proceeds to Step S48. On the other hand, in a case where the absolute value of the difference between the first distance information L1 and the second distance information L2 is the distance threshold value or less (Step S53: NO), the process proceeds to Step S46, and the tracking processing unit 11B determines that the first region set in Step S45 is the face region.

As described above, according to the modification example shown in FIG. 7, determination can be made whether or not erroneous tracking of a subject other than the face occurs, and the detection accuracy of the face region can be improved. As a result, it is possible to prevent exposure or focusing on an object other than the face, and improve the image quality of the captured image.

Figure 8:
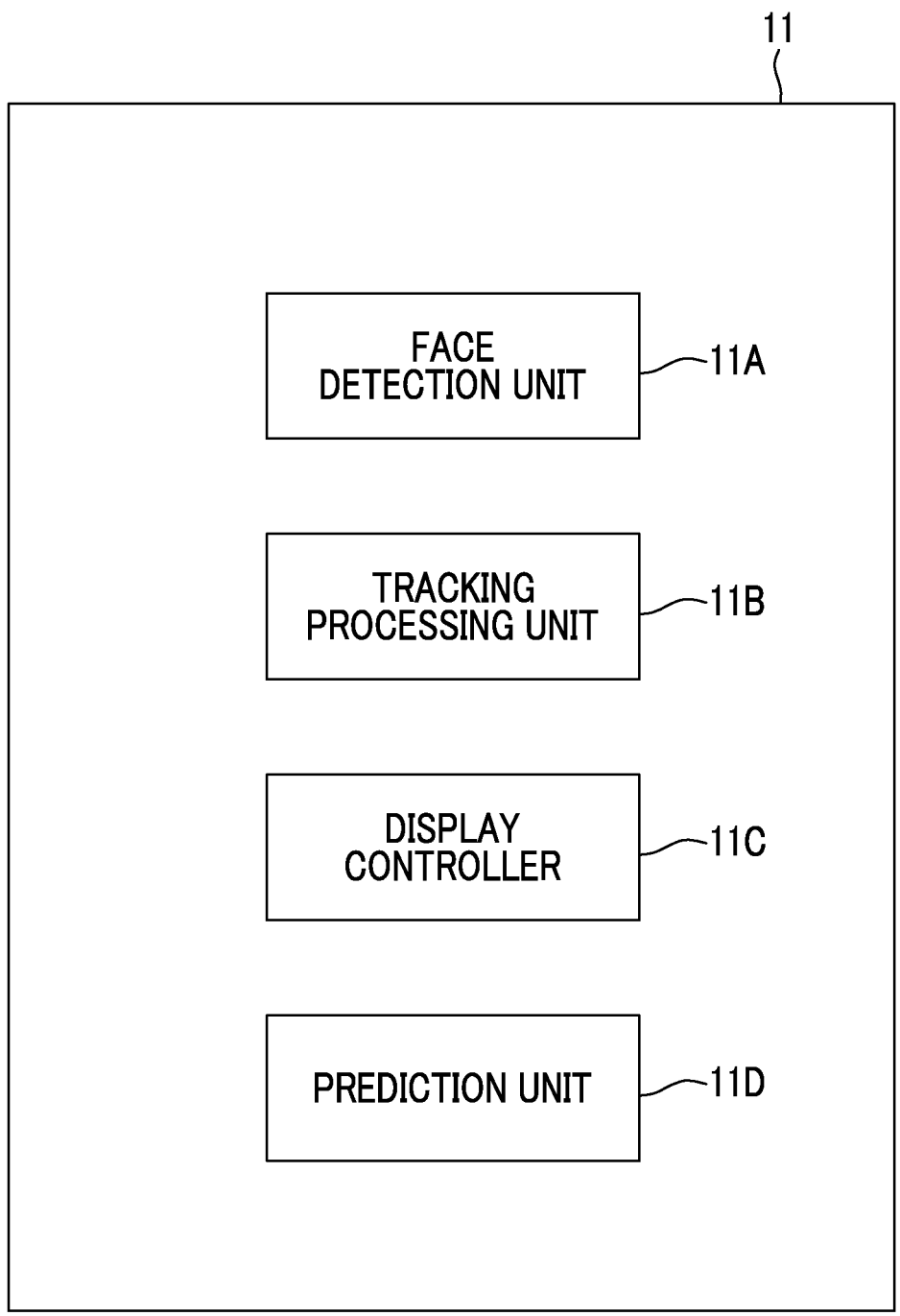
FIG. 8 is a diagram showing a modification example of the functional block of the system controller 11 of the digital camera 100 shown in FIG. 1.

FIG. 8 is a diagram showing a modification example of the functional block of the system controller 11 of the digital camera 100 shown in FIG. 1. The system controller 11 executes programs including a face region detection program, to function as a face detection unit 11A, a tracking processing unit 11B, a display controller 11C, and a prediction unit 11D. In the modification example, the tracking processing unit 11B performs the operation shown in FIG. 7.

The prediction unit 11D of the system controller 11 shown in FIG. 8 predicts a movement of the face included in the face region detected from the first captured image in which the reference image is set in Step S42 in FIG. 7, in the optical axis direction of the imaging optical system, on the basis of the first captured image and one or a plurality of captured images which are output from the imaging element 5 prior to the first captured image.

In a case where the movement of the face predicted by the prediction unit 11D is a first value, the tracking processing unit 11B of the system controller 11 shown in FIG. 8 reduces the distance threshold value as compared with a case where the movement is a second value larger than the first value.

The difference between the first distance information L1 and the second distance information L2 also becomes large in a case where the reference image and the first region include the same face and the face moves in the optical axis direction of the imaging optical system. Therefore, as described above, in a case where the movement of the face in the optical axis direction is predicted by the prediction unit 11D, and determination can be made that the movement is large, the movement of the face is added to increase the distance threshold value. By doing so, it is possible to determine with high accuracy whether or not erroneous tracking occurs.

Figure 9:
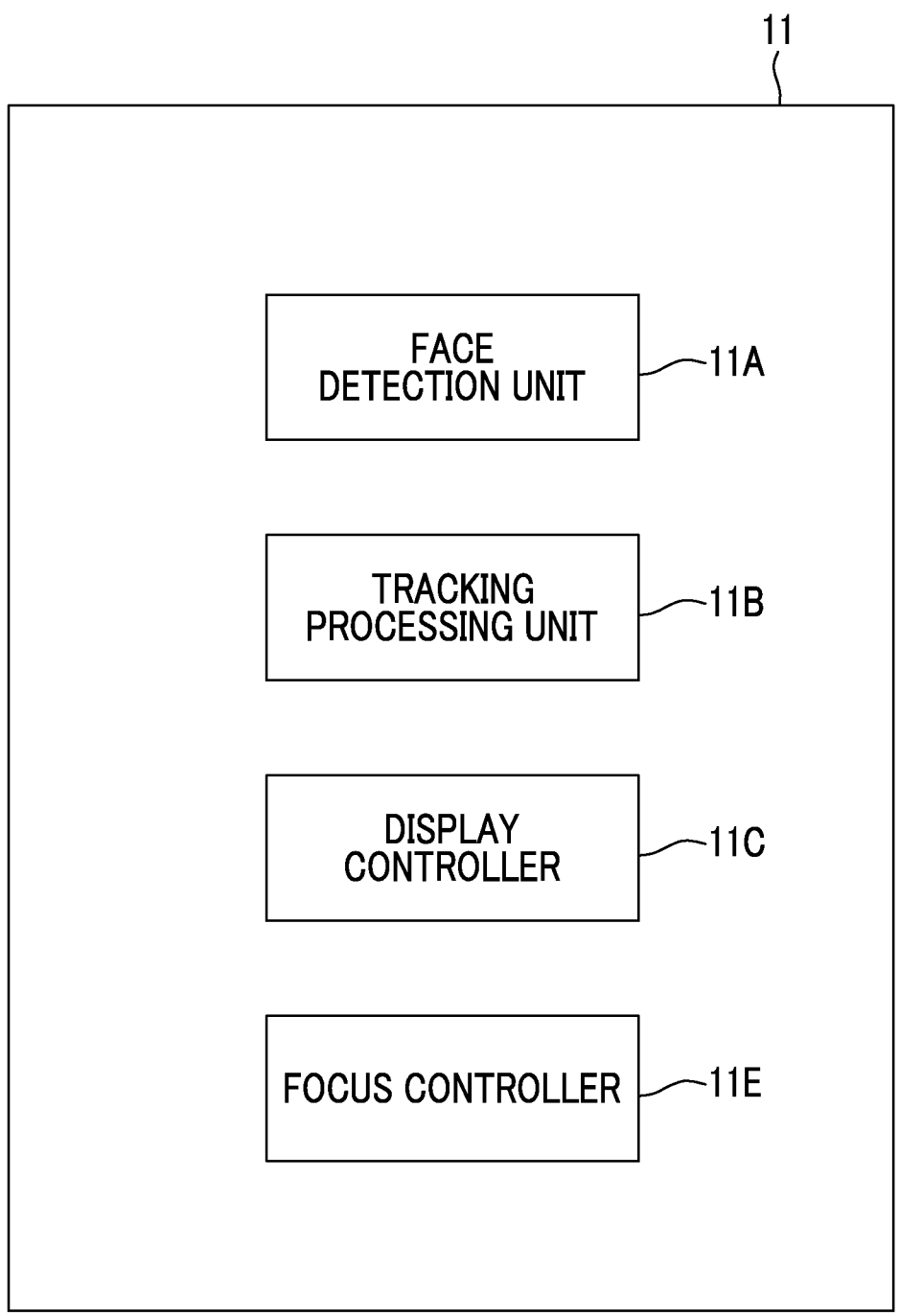
FIG. 9 is a diagram showing another modification example of the functional block of the system controller 11 of the digital camera 100 shown in FIG. 1.

FIG. 9 is a diagram showing another modification example of the functional block of the system controller 11 of the digital camera 100 shown in FIG. 1. The system controller 11 executes programs including a face region detection program, to function as a face detection unit 11A, a tracking processing unit 11B, a display controller 11C, and a focus controller 11E. In the modification example, the tracking processing unit 11B performs the operation shown in FIG. 7.

The focus controller 11E of the system controller 11 shown in FIG. 9 performs focus control of the imaging optical system on the basis of the image of the face region detected from the captured image by the face detection unit 11A or the tracking processing unit 11B.

In Step S53 of FIG. 7, in a case where the absolute value of the difference between the first distance information L1 and the second distance information L2 exceeds the distance threshold value, the tracking processing unit 11B of the system controller 11 shown in FIG. 9 fixes a focus state of the imaging optical system to the state so far such that the focus control is not performed on the basis of the first region which is likely not to include the face, until processing of Step S53 is performed next and determination of Step S53 becomes NO.

According to the modification example of FIG. 9, even in a case where a screen temporarily comes into the face region included in the second captured image, it is possible to prevent the screen from coming into focus. In a case where the screen disappears, determination of Step S53 becomes NO. Then, the face region without the screen can be instantly brought into focus. Therefore, even in a case where the screen momentarily enters between the face of the subject and the digital camera 100, it is possible to continue focusing on the face.

The modification example of FIG. 9 can be combined with the modification example of FIG. 8.

In the modification examples shown in FIGS. 7 to 9, the tracking processing unit 11B determines the presence or absence of erroneous tracking on the basis of the difference between the first distance information L1 of the subject included in the reference image of the first captured image and the second distance information L2 of the subject included in the first region of the second captured image.

Figure 10:
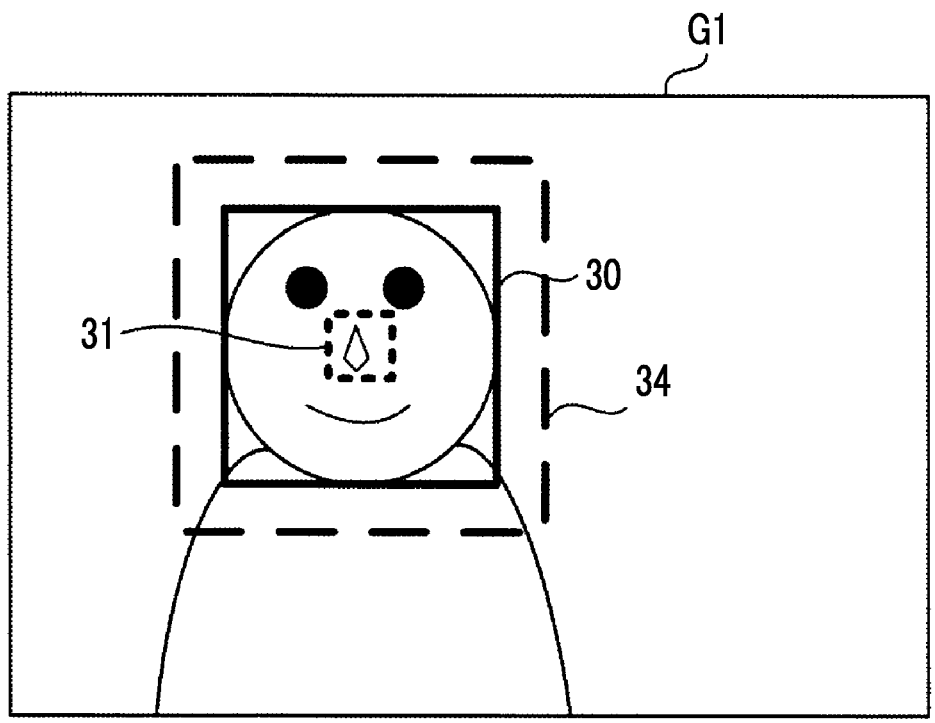
FIG. 10 is a schematic diagram illustrating a modification example of determination processing of erroneous tracking.
Figure 10:
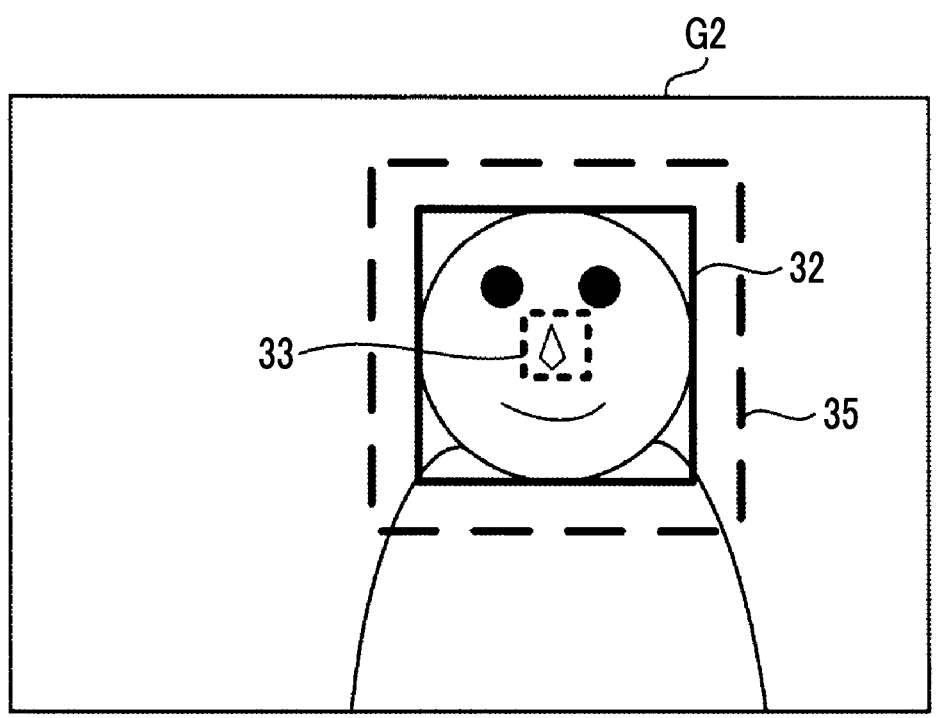

As the modification example, as shown in FIG. 10, the tracking processing unit 11B may calculate third distance information L3 of the subject included in a frame-shaped region 34 around the reference image (face region 30) of the first captured image G1 on the basis of signals of phase difference detection pixels of the region 34, calculate fourth distance information L4 of the subject included in a frame-shaped region 35 around the first region 32 of the second captured image G2 on the basis of signals of phase difference detection pixels of the region 35, and determine the presence or absence of erroneous tracking on the basis of the difference of the third distance information L3 and the fourth distance information L4.

Specifically, the tracking processing unit 11B determines in a step between Step S45 and Step S51 in FIG. 7 whether or not the absolute value of the difference between the third distance information L3 and the fourth distance information L4 exceeds the distance threshold value. Then, in a case where the absolute value exceeds the distance threshold value, the tracking processing unit 11B determines that the first region 32 set in the second captured image G2 is a non-face region, and in a case where the absolute value is the distance threshold value or less, the tracking processing unit 11B performs the processing of Step S51 and the subsequent steps.

As such, the tracking processing unit 11B determines the presence or absence of erroneous tracking in the second captured image on the basis of the difference between the distance of the subject around the reference image which is the face region and the distance of the subject around the first region to be determined as the face region, so that erroneous tracking can be detected before the screen comes into the actual face region.

In the examples of FIGS. 3, 6, and 10, the face region is a rectangular region, but the face region may have another shape including a face, such as a circle, an ellipse, a trapezoid, a rhombus, or a star.

Next, a configuration of a smartphone will be described as one embodiment of the imaging apparatus according to the embodiment of the present invention.

Figure 11:
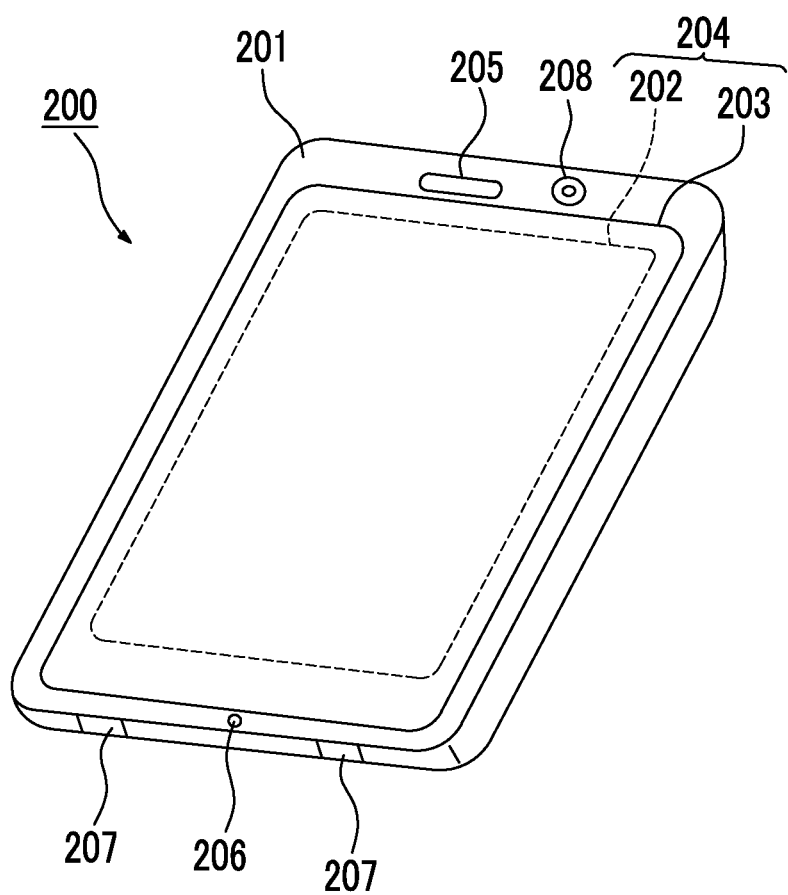
FIG. 11 shows an appearance of a smartphone 200 which is one embodiment of the imaging apparatus according to the embodiment of the present invention.

FIG. 11 shows an appearance of a smartphone 200 which is one embodiment of the imaging apparatus according to the embodiment of the present invention.

The smartphone 200 shown in FIG. 11 has a flat plate-shaped housing 201, and is provided with a display input unit 204 in which a display panel 202 as a display unit and an operation panel 203 as an input unit are integrated on one surface of the housing 201.

Further, such a housing 201 is provided with a speaker 205, a microphone 206, an operation unit 207, and a camera unit 208. The configuration of the housing 201 is not limited thereto, and for example, a configuration in which the display unit and the input unit are separately provided, or a configuration having a folding structure or a sliding mechanism may be employed.

Figure 12:
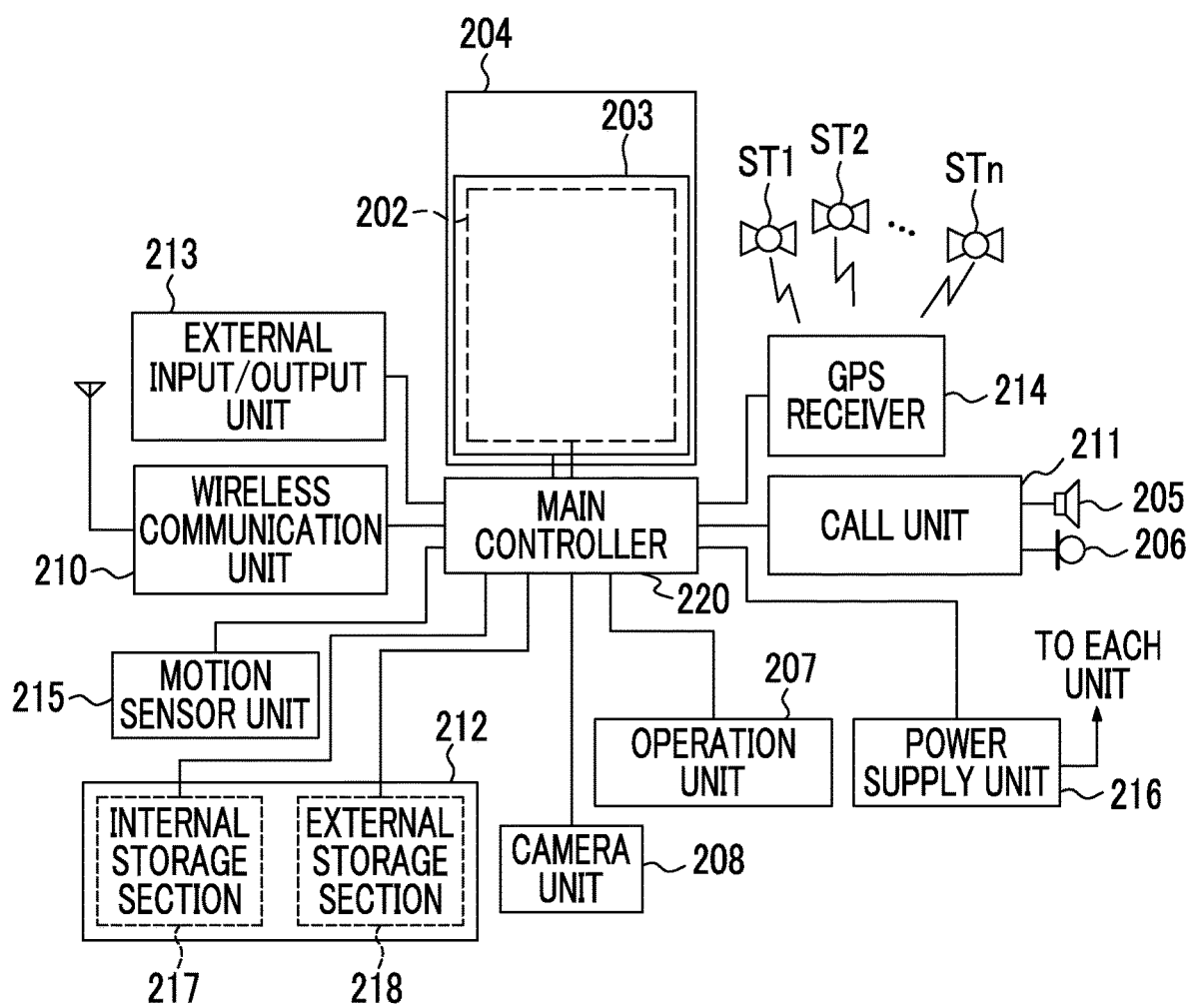
FIG. 12 is a block diagram showing a configuration of the smartphone 200 shown in FIG. 11.

FIG. 12 is a block diagram showing a configuration of the smartphone 200 shown in FIG. 11.

As shown in FIG. 12, as main components of the smartphone, a wireless communication unit 210, the display input unit 204, a call unit 211, an operation unit 207, a camera unit 208, a storage unit 212, an external input/output unit 213, a global positioning system (GPS) receiver 214, a motion sensor unit 215, a power supply unit 216, and a main controller 220 are provided.

Further, as a main function of the smartphone 200, a wireless communication function of performing mobile wireless communication via a base station device BS (not shown) and a mobile communication network NW (not shown) is provided.

The wireless communication unit 210 performs wireless communication with the base station device BS accommodated in the mobile communication network NW in accordance with the instruction of the main controller 220. By using the wireless communication, transmission/reception of various file data such as voice data and image data, e-mail data, and the like, and reception of web data, streaming data, or the like are performed.

The display input unit 204 is a so-called touch panel that displays images (still images and moving images), character information, or the like to visually convey information to the user, and that detects the user's operation on the displayed information, under the control of the main controller 220, and is provided with the display panel 202 and the operation panel 203.

In the display panel 202, a liquid crystal display (LCD), an organic electro-luminescence display (OELD), or the like is used as a display device.

The operation panel 203 is placed such that an image displayed on the display surface of the display panel 202 is visually recognizable, and is a device that detects one or a plurality of coordinates operated by the user's finger or a stylus. In a case where the device is operated by a user's finger or a stylus, a detection signal generated due to the operation is output to the main controller 220. Next, the main controller 220 detects the operation position (coordinates) on the display panel 202 on the basis of the received detection signal.

As shown in FIG. 12, the display panel 202 and the operation panel 203 of the smartphone 200 exemplified as one embodiment of the imaging apparatus according to the embodiment of the present invention are integrated to form the display input unit 204, and the operation panel 203 is disposed so as to cover the entire display panel 202.

In a case where such a disposition is employed, the operation panel 203 may have a function of detecting the user's operation even in a region outside the display panel 202. In other words, the operation panel 203 is provided with a detection region (hereinafter, referred to as a display region) for an overlapping portion overlapping the display panel 202 and a detection region (hereinafter, referred to as a non-display region) for the outer edge portion not overlapping the display panel 202 except the overlapping portion.

The size of the display region and the size of the display panel 202 may completely coincide with each other, but both the sizes do not necessarily coincide with each other. Further, the operation panel 203 may be provided with two sensitive regions of an outer edge portion and an inside portion except the outer edge portion. Further, the width of the outer edge portion is appropriately designed according to the size of the housing 201 and the like.

Furthermore, examples of the position detection method employed in the operation panel 203 include a matrix switching method, a resistance film method, a surface acoustic wave method, an infrared method, an electromagnetic induction method, and a capacitance method, and any of the methods can be employed.

The call unit 211 is provided with a speaker 205 or a microphone 206, and converts a user's voice received through the microphone 206 into voice data that can be processed by the main controller 220 to output the converted data to the main controller 220, or decodes voice data received from the wireless communication unit 210 or the external input/output unit 213 to make the speaker 205 output the decoding result.

Further, as shown in FIG. 11, for example, the speaker 205 can be mounted on the same surface as the surface on which the display input unit 204 is provided, and the microphone 206 can be mounted on the side surface of the housing 201.

The operation unit 207 is a hardware key using a key switch or the like, and receives the instruction from the user. For example, as shown in FIG. 11, the operation unit 207 is mounted on the side surface of the housing 201 of the smartphone 200, and is a push button type switch that is turned on when pressed with a finger or the like and that is turned off by a restoring force of a spring and the like when the finger is released.

The storage unit 212 stores control programs and control data of the main controller 220, application software, address data associated with the name or telephone number of the person on the phone, data of transmitted/received e-mail, web data downloaded by web browsing, and downloaded content data, or temporarily stores streaming data and the like. Further, the storage unit 212 is constituted of an internal storage section 217 built in the smartphone and an external storage section 218 having an attachable and detachable external memory slot.

Each of the internal storage section 217 and the external storage section 218 constituting the storage unit 212 is realized by using a storage medium such as a flash memory type memory, a hard disk type memory, a multimedia card micro type memory, a card type memory (for example, MicroSD (registered trademark) memory), a random access memory (RAM), and a read only memory (ROM).

The external input/output unit 213 serves as an interface with all external devices connected to the smartphone 200, and is used for communication and the like with other external devices (for example, universal serial bus (USB) and IEEE1394), or for direct or indirect connection to other external devices via a network (for example, Internet, wireless LAN, Bluetooth (registered trademark), radio frequency identification (RFID), infrared communication (Infrared Data Association: IrDA) (registered trademark), Ultra Wideband (UWB) (registered trademark), and ZigBee (registered trademark)).

Examples of the external devices connected to the smartphone 200 include a wired/wireless headset, a wired/wireless external charger, a wired/wireless data port, a memory card connected via a card socket, a subscriber identity module (SIM) card/user identity module (UIM) card, an external audio/video device connected via an audio/video input/output (I/O) terminal, a wirelessly connected external audio/video device, a smartphone connected in a wired/wireless manner, a personal computer connected in a wired/wireless manner, and an earphone.

The external input/output unit 213 can convey data transmitted from the external devices to each component inside the smartphone 200, or make data inside the smartphone 200 transmitted to the external devices.

The GPS receiver 214 receives GPS signals transmitted from GPS satellites ST1 to STn, executes positioning calculation processing based on the received plurality of GPS signals, and detects the position of the smartphone 200 consisting of latitude, longitude, and altitude, in accordance with the instruction of the main controller 220. In a case where the GPS receiver 214 can acquire the position information from the wireless communication unit 210 or the external input/output unit 213 (for example, wireless LAN), the GPS receiver 214 can also detect the position by using the position information.

The motion sensor unit 215 is provided with, for example, a three-axis acceleration sensor, and detects the physical movement of the smartphone 200 in accordance with the instruction of the main controller 220. By detecting the physical movement of the smartphone 200, the moving direction or acceleration of the smartphone 200 is detected. The detection result is output to the main controller 220.

The power supply unit 216 supplies electric power stored in a battery (not shown) to each unit of the smartphone 200 in accordance with the instruction of the main controller 220.

The main controller 220 is provided with a microprocessor, and operates in accordance with a control program and control data stored in the storage unit 212 and controls each unit of the smartphone 200 in an integrated manner. Further, the main controller 220 is provided with a mobile communication control function of controlling each unit of the communication system and an application processing function, in order to perform voice communication or data communication through the wireless communication unit 210.

The application processing function is realized by the main controller 220 operating in accordance with the application software stored in the storage unit 212. Examples of the application processing function include an infrared communication function of controlling the external input/output unit 213 to perform data communication with a counterpart device, an e-mail function of transmitting/receiving e-mail, or a web browsing function of browsing a web page.

Further, the main controller 220 is provided with an image processing function of displaying a video on the display input unit 204 on the basis of image data (data of still images or moving images) such as received data or downloaded streaming data.

The image processing function refers to a function in which the main controller 220 decodes the image data, performs image processing on the decoding result, and displays the image on the display input unit 204.

Further, the main controller 220 executes display control on the display panel 202 and operation detection control for detecting a user's operation through the operation unit 207 and the operation panel 203.

By executing the display control, the main controller 220 displays a window which is used to display a software key such as an icon or a scroll bar for starting the application software, or to create an e-mail.

The scroll bar refers to a software key for receiving the instruction on moving a display portion of an image such as a large image that cannot fit into the display region of the display panel 202.

Further, by executing the operation detection control, the main controller 220 detects the user's operation through the operation unit 207, receives the operation for the icon and the input of the character string to the input field of the window through the operation panel 203, or receives a request for scrolling a display image through the scroll bar.

Furthermore, by executing the operation detection control, the main controller 220 is provided with a touch panel control function of determining whether the operation position on the operation panel 203 is the overlapping portion (display region) overlapping the display panel 202 or the outer edge portion (non-display region) not overlapping the display panel 202 except the overlapping portion, and controlling the sensitive region of the operation panel 203 or the display position of the software key.

Further, the main controller 220 can also detect a gesture operation on the operation panel 203 and execute a preset function in response to the detected gesture operation.

The gesture operation means not a conventional simple touch operation, but an operation of drawing a trajectory with a finger or the like, specifying a plurality of positions at the same time, or drawing a trajectory for at least one from among the plurality of positions by using the combination thereof.

The camera unit 208 includes configurations other than the external memory controller 20, the storage medium 21, the display controller 22, the display unit 23, and the operation unit 14 in the digital camera shown in FIG. 1.

The captured image data generated by the camera unit 208 can be stored in the storage unit 212 or output through the external input/output unit 213 or the wireless communication unit 210.

In the smartphone 200 shown in FIG. 11, the camera unit 208 is mounted on the same surface as the display input unit 204, but the mounting position of the camera unit 208 is not limited thereto. The camera unit 208 may be mounted on the back surface of the display input unit 204.

Further, the camera unit 208 can be used for various functions of the smartphone 200. For example, the image acquired by the camera unit 208 can be displayed on the display panel 202, or the image of the camera unit 208 can be used as one of the operational inputs for the operation panel 203.

Further, in a case where the GPS receiver 214 detects the position, the GPS receiver 214 can detect the position by referring to the image from the camera unit 208. Furthermore, the optical axis direction of the camera unit 208 of the smartphone 200, or the current usage environment can also be determined by referring to the image from the camera unit 208 in combination with the three-axis acceleration sensor or without using the three-axis acceleration sensor. Of course, the image from the camera unit 208 can also be used in the application software.

In addition, the position information acquired by the GPS receiver 214, the voice information acquired by the microphone 206 (the voice information may be text information by being converted into voice text by the main controller and the like), posture information acquired by the motion sensor unit 215 can also be added to image data of still pictures or motion pictures, and stored in the storage unit 212 or output through the external input/output unit 213 or the wireless communication unit 210.

With the smartphone 200 having the above-described configuration, the face region can also be detected with a light load.

As described above, the following matters are disclosed in the present specification.

(1)

A face region detection device that detects a face region from a captured image which is output from an imaging element, the device comprising:
  a processor configured to
    set the face region detected from a first captured image, as a reference image, and search for a similar region similar to a specific image which is a part of the reference image from a second captured image output after the first captured image,
    in a case where the second captured image is determined to have the similar region similar to the specific image, set a first region as a face region, the first region includes the similar region in the second captured image, and
    set the first region such that a size of the first region is same for a size of the reference image, and such that a position of the similar region in the first region coincide with a position of the specific image in the reference image, using a positional relationship between the reference image and the specific image in the first captured image.

(2)

The face region detection device according to (1),
  in which in a case where a difference between first distance information of a subject included in the reference image and second distance information of the subject included in the first region exceeds a predetermined distance threshold value, the processor is configured to determine that the first region is a non-face region.

(3)

The face region detection device according to (2),
  the processor is configured to predict a movement of a face included in the face region of the first captured image, in an optical axis direction of an imaging optical system for making the imaging element form a subject image, on the basis of the first captured image and the captured image which is output from the imaging element prior to the first captured image, and
  control the distance threshold value on the basis of the movement which is predicted.

(4)

The face region detection device according to (3),
in which in a case where the movement is a first value, the processor is configured to reduce the distance threshold value as compared with a case where the movement is a second value larger than the first value.

(5)

The face region detection device according to any one of (2) to (4),
in which the processor is configured to perform focus control of an imaging optical system for making the imaging element form a subject image, on the basis of the face region detected from the captured image, and
in a case where the difference exceeds the distance threshold value, fix a focus state of the imaging optical system for a predetermined period of time.

(6)

The face region detection device according to (1),
in which in a case where a difference between third distance information of a subject included in a region around the reference image in the first captured image and fourth distance information of the subject included in a region around the first region in the second captured image exceeds a predetermined distance threshold value, the processor is configured to determine that the first region is a non-face region.

(7)

The face region detection device according to any one of (1) to (6),
in which the processor is configured to decide the specific image on the basis of an analysis result of the reference image.

(8)

The face region detection device according to (7),
in which the processor is configured to obtain a contrast value of the reference image, and decides a portion of the reference image in which the contrast value exceeds a predetermined threshold value, as the specific image.

(9)

An imaging apparatus comprising:
the face region detection device according to any one of (1) to (8); and
the imaging element.

(10)

A face region detection method of detecting a face region from a captured image which is output from an imaging element, the method comprising:
a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image,
in which, in the tracking processing step, setting the first region such that a size of the first region is same for a size of the reference image, and such that a position of the similar region in the first region coincide with a position of the specific image in the reference image, using a positional relationship between the reference image and the specific image in the first captured image.

(11)

The face region detection method according to (10),
in which in the tracking processing step, in a case where a difference between first distance information of a subject included in the reference image and second distance information of the subject included in the first region exceeds a predetermined distance threshold value, determination is made that the first region is a non-face region.

(12)

The face region detection method according to (11), further comprising:
a prediction step of predicting a movement of a face included in the face region of the first captured image, in an optical axis direction of an imaging optical system for making the imaging element form a subject image, on the basis of the first captured image and the captured image which is output from the imaging element prior to the first captured image,
in which in the tracking processing step, the distance threshold value is controlled on the basis of the movement predicted in the prediction step.

(13)

The face region detection method according to (12),
in which in the tracking processing step, in a case where the movement is a first value, the distance threshold value is reduced as compared with a case where the movement is a second value larger than the first value.

(14)

The face region detection method according to any one of (11) to (13), further comprising:
a focus control step of performing focus control of an imaging optical system for making the imaging element form a subject image, on the basis of the face region detected from the captured image,
in which in the focus control step, in a case where the difference exceeds the distance threshold value, a focus state of the imaging optical system is fixed for a predetermined period of time.

(15)

The face region detection method according to (10),
in which in the tracking processing step, in a case where a difference between third distance information of a subject included in a region around the reference image in the first captured image and fourth distance information of the subject included in a region around the first region in the second captured image exceeds a predetermined distance threshold value, determination is made that the first region is a non-face region.

(16)

The face region detection method according to any one of (10) to (15),
in which in the tracking processing step, the specific image is decided on the basis of an analysis result of the reference image.

(17)

The face region detection method according to (16),
in which in the tracking processing step, a contrast value of the reference image is obtained, and a portion of the reference image in which the contrast value exceeds a predetermined threshold value is decided as the specific image.

(18)

A non-transitory computer readable recording medium storing a face region detection program for detecting a face region from a captured image which is output from an imaging element, the program causing a computer to execute:

a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image, in which, in the tracking processing step, setting the first region such that a size of the first region is same for a size of the reference image, and such that a position of the similar region in the first region coincide with a position of the specific image in the reference image, using a positional relationship between the reference image and the specific image in the first captured image.

The present invention is convenient and effective particularly in a case of being applied to a digital camera, a smartphone, or the like.

EXPLANATION OF REFERENCES

1: imaging lens
2: stop
4: lens controller
5: imaging element
6: analog signal processing unit
7: analog-to-digital conversion circuit
8: lens drive unit
9: stop drive unit
10: imaging element drive unit
11: system controller
11A: face detection unit
11B: tracking processing unit
11C: display controller
11D: prediction unit
11E: focus controller
14: operation unit
15: memory controller
16: main memory
17: digital signal processing unit
20: external memory controller
21: storage medium
22: display controller
23: display unit
24: control bus
25: data bus
40: lens device
G1: first captured image
30: face region
31: specific image
G2: second captured image
32: first region
33: similar region
34, 35: region
200: smartphone
201: housing
202: display panel
203: operation panel
204: display input unit
205: speaker
206: microphone
207: operation unit
208: camera unit
210: wireless communication unit
211: call unit
212: storage unit
213: external input/output unit
214: GPS receiver
215: motion sensor unit
216: power supply unit
217: internal storage section
218: external storage section
220: main controller
ST1 to STn: GPS satellite

What is claimed is:

1. A face region detection device that detects a face region from a captured image which is output from an imaging element, the device comprising:
   a processor configured to
      set the face region detected from a first captured image, as a reference image, and search for a similar region similar to a specific image which is a part of the reference image from a second captured image output after the first captured image,
      in a case where the second captured image is determined to have the similar region similar to the specific image, set a first region as a face region, the first region includes the similar region in the second captured image,
      determine a positional relationship between the reference image and the specific image in the first captured image; and
      set the first region such that a size of the first region is same for a size of the reference image, and such that a position of the similar region in the first region coincide with a position of the specific image in the reference image, using the positional relationship between the reference image and the specific image in the first captured image,
   wherein in a case where a difference between first distance information of a subject included in the reference image and second distance information of the subject included in the first region exceeds a predetermined distance threshold value,
   the processor is configured to determine that the first region is a non-face region.

2. The face region detection device according to claim 1, wherein the processor is configured to predict a movement of a face included in the face region of the first captured image, in an optical axis direction of an imaging optical system for making the imaging element form a subject image, on the basis of the first captured image and the captured image which is output from the imaging element prior to the first captured image, and control the distance threshold value on the basis of the movement which is predicted.

3. The face region detection device according to claim 2, wherein in a case where the movement is a first value, the processor is configured to reduce the distance threshold value as compared with a case where the movement is a second value larger than the first value.

4. The face region detection device according to claim 3, wherein the processor is configured to perform focus control of an imaging optical system for making the imaging element form a subject image, on the basis of the face region detected from the captured image, and in a case where the difference exceeds the distance threshold value, fix a focus state of the imaging optical system for a predetermined period of time.

5. The face region detection device according to claim 2, wherein the processor is configured to perform focus control of an imaging optical system for making the imaging element form a subject image, on the basis of the face region detected from the captured image, and in a case where the difference exceeds the distance threshold value, fix a focus state of the imaging optical system for a predetermined period of time.

6. The face region detection device according to claim 1, wherein the processor is configured to perform focus control of an imaging optical system for making the imaging element form a subject image, on the basis of the face region detected from the captured image, and in a case where the difference exceeds the distance threshold value, fix a focus state of the imaging optical system for a predetermined period of time.

7. The face region detection device according to claim 1, wherein the processor is configured to decide the specific image on the basis of an analysis result of the reference image.

8. The face region detection device according to claim 7, wherein the processor is configured to obtain a contrast value of the reference image, and decide a portion of the reference image in which the contrast value exceeds a predetermined threshold value, as the specific image.

9. An imaging apparatus comprising:
the face region detection device according to claim 1; and
the imaging element.

10. A face region detection method of detecting a face region from a captured image which is output from an imaging element, the method comprising:
a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image,
wherein, in the tracking processing step, determining a positional relationship between the reference image and the specific image in the first captured image, setting the first region such that a size of the first region is same for a size of the reference image, and such that a position of the similar region in the first region coincide with a position of the specific image in the reference image, using the positional relationship between the reference image and the specific image in the first captured image,
wherein in the tracking processing step, in a case where a difference between first distance information of a subject included in the reference image and second distance information of the subject included in the first region exceeds a predetermined distance threshold value, determination is made that the first region is a non-face region.

11. The face region detection method according to claim 10, further comprising:
a prediction step of predicting a movement of a face included in the face region of the first captured image, in an optical axis direction of an imaging optical system for making the imaging element form a subject image, on the basis of the first captured image and the captured image which is output from the imaging element prior to the first captured image,
wherein in the tracking processing step, the distance threshold value is controlled on the basis of the movement predicted in the prediction step.

12. The face region detection method according to claim 11, wherein in the tracking processing step, in a case where the movement is a first value, the distance threshold value is reduced as compared with a case where the movement is a second value larger than the first value.

13. The face region detection method according to claim 10, further comprising:
a focus control step of performing focus control of an imaging optical system for making the imaging element form a subject image, on the basis of the face region detected from the captured image,
wherein in the focus control step, in a case where the difference exceeds the distance threshold value, a focus state of the imaging optical system is fixed for a predetermined period of time.

14. The face region detection method according to claim 10, wherein in the tracking processing step, the specific image is decided on the basis of an analysis result of the reference image.

15. The face region detection method according to claim 14, wherein in the tracking processing step, a contrast value of the reference image is obtained, and a portion of the reference image in which the contrast value exceeds a predetermined threshold value is decided as the specific image.

16. A non-transitory computer readable recording medium storing a face region detection program for detecting a face region from a captured image which is output from an imaging element, the program causing a computer to execute:
a tracking processing step of setting the face region detected from a first captured image, as a reference image, searching for a similar region similar to a specific image which is a part of the reference image from a second captured image output after the first captured image, and setting a first region including the similar region in the second captured image as the face region in a case where the second captured image is determined to have the similar region similar to the specific image,
wherein, in the tracking processing step, determining a positional relationship between the reference image and the specific image in the first captured image, setting the first region such that a size of the first region is same for a size of the reference image, and such that a position of the similar region in the first region coincide with a position of the specific image in the reference image, using the positional relationship between the reference image and the specific image in the first captured image,
wherein in the tracking processing step, in a case where a difference between first distance information of a subject included in the reference image and second distance information of the subject included in the first region exceeds a predetermined distance threshold value, determination is made that the first region is a non-face region.

* * * * *